(12) United States Patent
Wang

(10) Patent No.: US 9,451,848 B2
(45) Date of Patent: Sep. 27, 2016

(54) BEVERAGE DISPENSER AND COFFEE MAKER

(71) Applicant: Elec-Tech International Co., Ltd., Zhuhai, Guangdong (CN)

(72) Inventor: Tony Wang, Guangdong (CN)

(73) Assignee: Elec-Tech International Co., Ltd., Zhuhai, Guangdong (CN)

( * ) Notice: Subject to any disclaimer, the term of this patent is extended or adjusted under 35 U.S.C. 154(b) by 285 days.

(21) Appl. No.: 14/191,116

(22) Filed: Feb. 26, 2014

(65) Prior Publication Data

US 2014/0238248 A1    Aug. 28, 2014

(30) Foreign Application Priority Data

Feb. 26, 2013   (CN) .......................... 2013 1 0061046

(51) Int. Cl.
  *A47J 31/00*  (2006.01)
  *G01F 11/28*  (2006.01)
  *A47J 31/46*  (2006.01)
  *A47J 31/56*  (2006.01)

(52) U.S. Cl.
  CPC .............. *A47J 31/467* (2013.01); *A47J 31/56* (2013.01); *G01F 11/28* (2013.01); *G01F 11/282* (2013.01)

(58) Field of Classification Search
  CPC .... G01F 11/262; G01F 11/261; G01F 11/28; G01F 11/282; A47J 31/56
  USPC ....... 222/424.5, 434, 436, 437, 457; 99/301, 99/300
  See application file for complete search history.

(56) References Cited

U.S. PATENT DOCUMENTS

| | | | | |
|---|---|---|---|---|
| 1,018,924 A * | 2/1912 | Patnaude | ............... | G01F 11/28 141/364 |
| 2,761,595 A * | 9/1956 | Verger | ................... | G01F 11/38 222/437 |
| 3,760,981 A * | 9/1973 | Weed | ..................... | G01F 11/28 222/14 |
| 4,291,820 A * | 9/1981 | Marrington | ............. | G01F 11/32 222/159 |
| 6,957,751 B2 * | 10/2005 | Ophardt | ............... | A47K 5/1202 222/188 |
| 8,132,499 B2 * | 3/2012 | Lowe | ..................... | A47J 31/54 222/146.2 |

* cited by examiner

*Primary Examiner* — Reginald L Alexander
(74) *Attorney, Agent, or Firm* — Colin P. Cahoon; Shaukat A. Karjeker; Carstens & Cahoon, LLP

(57) ABSTRACT

The present disclosure provides a beverage dispenser comprising a larger container for accommodating the beverage to be dispensed, a smaller container for accommodating the beverage dispensed and a connecting channel connecting the larger container and the smaller container. The beverage dispenser further comprises a rationing vessel, which has an upper opening and a lower opening; the upper opening of the rationing vessel opens to atmosphere; the lower opening of the rationing vessel is disposed in or communicates with an inner cavity of the smaller container; and the larger container has a vent opening to atmosphere. The beverage in the larger container flows into the smaller container through the connecting channel. The beverage in the smaller container is dispensed based on theories of static physics rather than relying on electronic control. The coffee maker of the present disclosure comprises a housing, the beverage dispenser and a brewing unit, both installed inside the housing, wherein, the beverage dispenser communicates with the brewing unit. It is easy to operate the coffee maker of the present disclosure to dispense a pre-determined amount of beverage without electronic control.

7 Claims, 6 Drawing Sheets

BEVERAGE DISPENSER AND COFFEE MAKER

TECHNICAL FIELD

The present disclosure relates to the technical field of a dispensing device for liquid beverage, and more particularly, to a beverage dispenser and a coffee maker.

BACKGROUND OF THE INVENTION

In daily life, liquid beverages often need to be dispensed, especially, need to be dispensed in a pre-determined amount. As we all know, in the process of mixing cocktail or making coffee, only if different beverages are dispensed in pre-determined amounts according to the requirement of formulae, can a good mixed drink be made.

As we know, a common coffee maker provides a solution for meeting the requirement of dispensing the liquids in pre-determined amounts by means of electronic program. Through this method, the liquids can be dispensed in pre-determined amounts successfully, however, since complicated components such as electronic circuits need to be applied in this method, it has no advantages in production cost. What's more, the application of this method is limited, for example, when power is off, the dispensing device of the coffee maker cannot be operated.

SUMMARY OF THE INVENTION

In view of the defects existing in the prior art, in one aspect, the present disclosure provides a beverage dispenser with a simple structure, which is easy to operate to dispense a pre-determined amount of beverage without electronic control.

The present disclosure is achieved by the following technical schemes:

A beverage dispenser, comprising a larger container, a smaller container and a connecting channel connecting the larger container and the smaller container; wherein, an upper liquid level of an inner cavity of the larger container is higher than a highest liquid level of an inner cavity of the smaller container; the beverage dispenser further comprises a rationing vessel, which has an upper opening and a lower opening; the upper opening of the rationing vessel opens to atmosphere; the lower opening of the rationing vessel is disposed in or communicates with an inner cavity of the smaller container; and the larger container has a vent opening to atmosphere.

According to one embodiment, a level of the upper opening of the rationing vessel is higher than the highest liquid level of the inner cavity of the larger container.

Preferably, the rationing vessel comprises one or more dispensing tubes, each of the dispensing tubes opens at both ends and has a second upper end, a second lower end and a third side wall; a level of the second upper end of the dispensing tube is higher than the highest liquid level of the inner cavity of the larger container; an upper opening is disposed in the second upper end and opens to atmosphere; and the second lower end is inserted inside the smaller container.

Preferably, the dispensing tube is detachably connected to the smaller container and is adjustable up and down.

Preferably, the third side wall of the dispensing tube is tightly connected and fit with a wall of the smaller container.

Preferably, two ends of the connecting channel are tightly connected and fit with the larger container and the smaller container respectively.

In another aspect, the present disclosure provides a coffee maker, comprising a housing, the beverage dispenser and a brewing unit, the beverage dispenser and the brewing unit are installed inside the housing; and the beverage dispenser communicates with the brewing unit.

The present disclosure has following advantages:

As described above, the beverage dispenser comprises a larger container, a smaller container and a connecting channel connecting the larger container and the smaller container; wherein, an upper liquid level of an inner cavity of the larger container is higher than a highest liquid level of an inner cavity of the smaller container; the beverage dispenser further comprises a rationing vessel, which has an upper opening and a lower opening; the upper opening of the rationing vessel opens to atmosphere; the lower opening of the rationing vessel is disposed in or communicates with an inner cavity of the smaller container; and the larger container has a vent opening to atmosphere.

The beverage in the larger container passes through the connecting channel and flows into the smaller container, as a result, the level of the beverage in the smaller container rises continuously along with the flowing of the beverage. After the level of the beverage rises to the level of the second lower end of the dispensing tube, the beverage seals the second lower end of the dispensing tube, so as to form a sealed space between the level of the beverage and the inner surface of the smaller container, which is not soaked by the beverages. As known from theories of static physics, pressure intensity exerted on liquid in a sealed container can be transferred equally in all directions by the liquid, so the pressure intensity exerted on the level of the beverage in the sealed container equals to the pressure intensity exerted on the first bottom wall of the larger container, and the level of beverage will not rise any longer.

When the second upper end of the dispensing tube opens to the atmosphere, namely, the liquid in the dispensing tube is exposed to the atmosphere through the dispensing tube, and the pressure intensity exerted on the upper surface of the liquid in the dispensing tube is equal to the atmosphere pressure. As known from theories of static physics, the pressure intensity exerted on the upper surface of the liquid in the dispensing tube is less than the pressure intensity exerted on the first bottom wall of the larger container, and the pressure intensity difference of the two equals to the pressure intensity produced by the height of liquid in the larger container. So the beverage in the larger container passes through the connecting channel and flows into the smaller container, as a result, the level of the beverage in the dispensing tube rises continuously. When the height of the beverage in the dispensing tube is equal to the height of the beverage in the larger container, namely, when the pressure intensity exerted on the second lower end of the dispensing tube equals to the pressure intensity exerted on the first bottom wall of the larger container, the beverage in the larger container stops flowing into the smaller container. Thereby, a pre-determined amount of beverage is dispensed in the smaller container.

Therefore, the beverage dispenser of the present disclosure has low production cost, and is capable of dispensing a pre-determined amount of beverage safely and reliably, without electronic control.

The coffee maker of the present disclosure comprises a housing, the beverage dispenser and a brewing unit, both installed inside the housing. It is easy to operate the coffee maker of the present disclosure to dispense a pre-determined amount of beverage without electronic control.

DETAILED DESCRIPTION OF THE PREFERRED EMBODIMENTS

Figure 1:
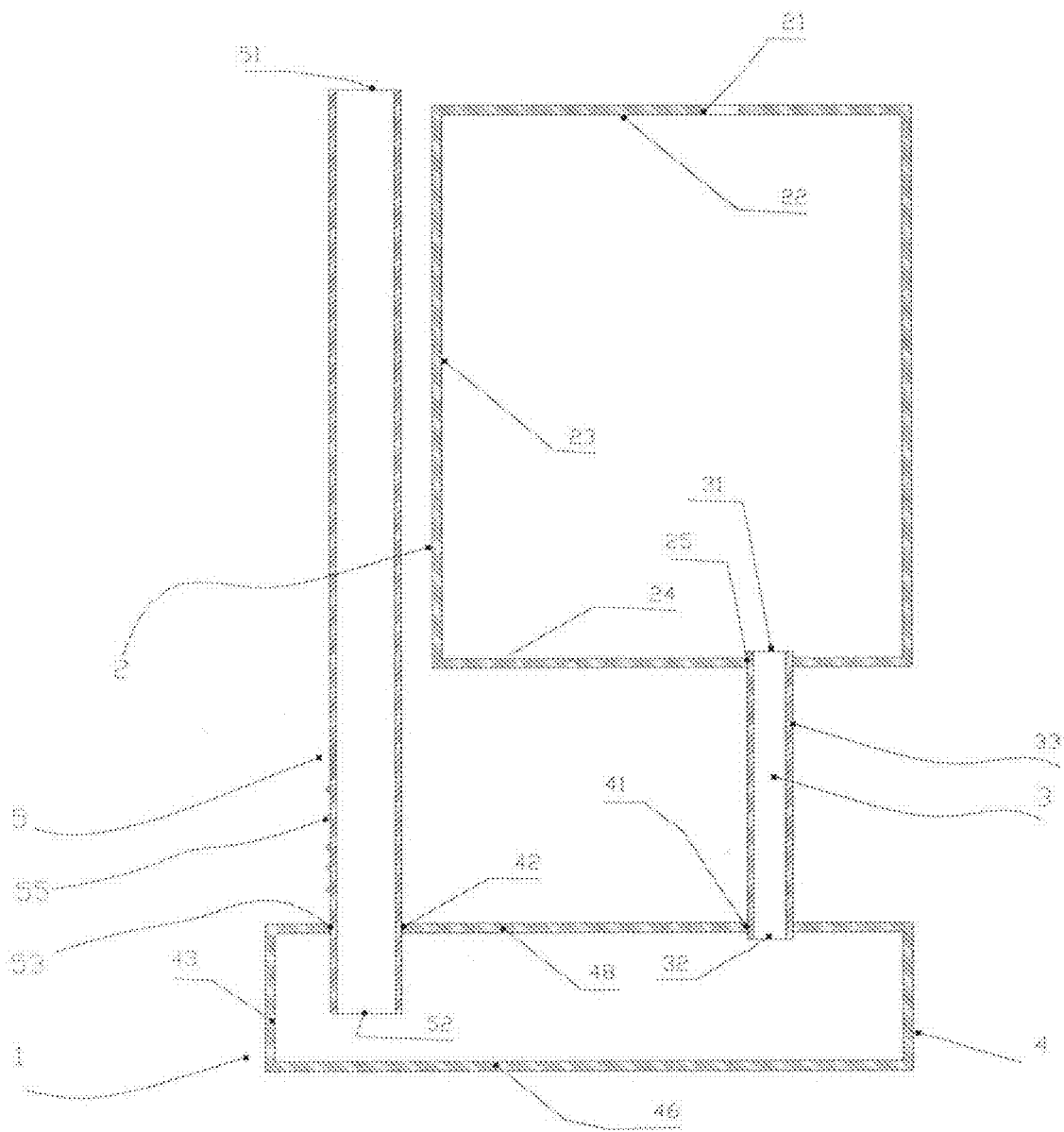
FIG. 1 is a sectional view of the beverage dispenser according to the first embodiment of the present invention.

In order to solve the problems in the prior art, the present disclosure provides a beverage dispenser comprising a larger container, a smaller container and a connecting channel connecting the larger container and the smaller container. The upper liquid level of the inner cavity of the larger container is higher than the highest liquid level of the inner cavity of the smaller container. The beverage dispenser further comprises a rationing vessel, which has an upper opening and a lower opening. The upper opening of the rationing vessel opens to the atmosphere and the lower opening of the rationing vessel is disposed in or communicates with the inner cavity of the smaller container. The larger container has a vent opening to the atmosphere.

In one embodiment, the level of the upper opening of the rationing vessel is higher than the highest liquid level of the inner cavity of the larger container.

Preferably, the rationing vessel comprises one or more dispensing tubes. Each of the dispensing tubes opens at both ends, and comprises a second upper end, a second lower end and a third side wall. The level of the second upper end of the dispensing tube is higher than the highest liquid level of the inner cavity of the larger container. The upper opening is disposed on the second upper end and opens to the atmosphere, and the second lower end is inserted inside the smaller container.

Preferably, the dispensing tube is detachably connected to the smaller container and is adjustable up and down.

Preferably, the third side wall of the dispensing tube is tightly connected and fit with the wall of the smaller container.

Preferably, two ends of the connecting channel are tightly connected and fit with the larger container and the smaller container respectively.

The coffee maker comprises a housing, the beverage dispenser and a brewing unit, both installed inside the housing. The beverage dispenser communicates with the brewing unit.

The First Embodiment

The first embodiment will be described in conjunction with the accompanying FIGS. 1-4.

According to the first embodiment, the beverage dispenser 1 comprises a larger container 2 for accommodating the beverage 60 to be dispensed. The larger container 2 includes a first bottom wall 24, a first top wall 22, and a first side wall 23 connecting the first bottom wall and the first top wall. The first top wall 22 has a vent 21 and the first bottom wall 24 is provided with an opening 25.

The beverage dispenser 1 further comprises a smaller container 4 for accommodating dispensed beverage 70. The smaller container 4 includes a second bottom wall 46, a second top wall 48 and a second side wall 43 connecting the second bottom wall 46 and the second top wall 48. The second top wall 48 of the smaller container has a first opening 41 and a second opening 42.

A connecting channel 3 is provided between the larger container 2 and the smaller container 4 to enable the beverage 60 in the larger container 2 to flow into the smaller container 4. The connecting channel 3 opens at both ends and has a tube wall 33, a first upper end 31 and a first lower end 32. The first upper end 31 of the connecting channel 3 is tightly connected and fit with the opening 25 of the larger container 2, forming a sealed pipe for the beverage 60 in the larger container 2 to flow into the connecting channel 3. The first lower end 32 is tightly connected and fit with the first opening 41 of the smaller container 4, forming a sealed pipe for the beverage to flow into the smaller container 4.

The beverage dispenser 1 further comprises a dispensing tube 5. The dispensing tube 5 opens at both ends and comprises a third side wall 53, the outer surface of which is marked with volume scale 55. The dispensing tube has a second upper end 51 and a second lower end 52. The second upper end 51 is exposed in atmosphere, and the second lower end 52 passes through the second opening 42 and is inserted inside the smaller container 4. The third side wall 53 of the dispensing tube 5 is detachably connected to the second opening 42.

Preferably, the level of the first lower end 32 of the connecting channel 3, which is disposed in the smaller container 4, is higher than the level of the second lower end 52 of the dispensing tube 5, which is also disposed in the smaller container 4.

Preferably, the level of the first bottom wall 24 of the larger container 2 is higher than the level of the second top wall 48 of the smaller container.

Figure 2:
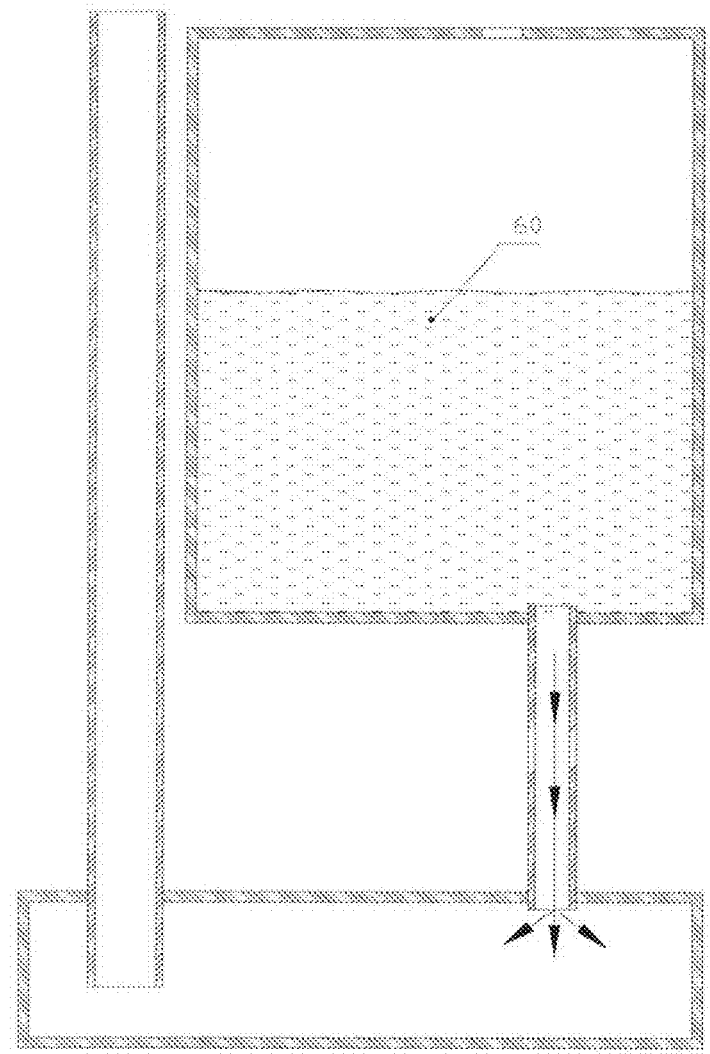
FIG. 2 is a sectional view illustrating the beverage dispenser as shown in FIG. 1, when the beverage in the larger container flows into the smaller container.
Figure 3:
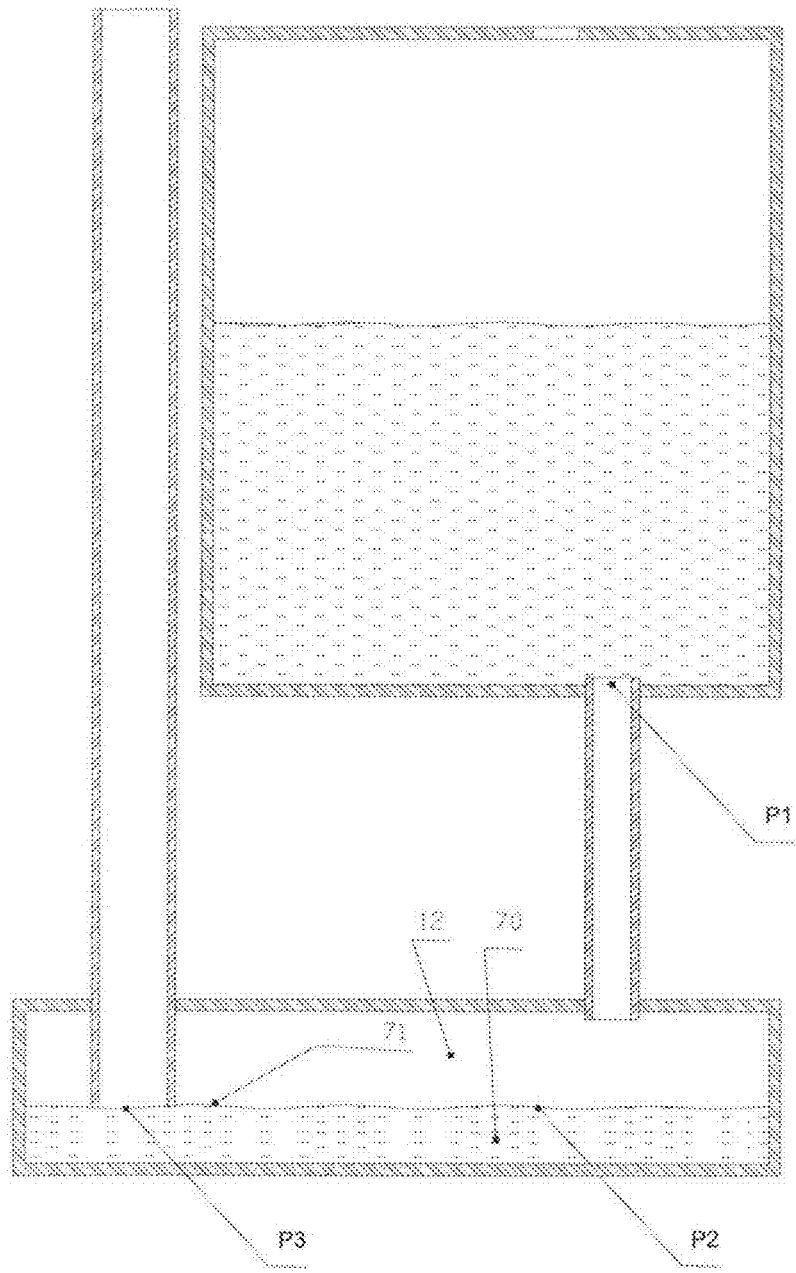
FIG. 3 is a sectional view illustrating the beverage dispenser as shown in FIG. 1, when the beverage level rises to the level of the lower end of the dispensing tube.

As shown in FIG. 2, the beverage 60 in the larger container 2 passes through the connecting channel 3 and flows into the smaller container 4, as a result, the level 24 of the beverage 70 in the smaller container 4 rises continuously along with the flowing of the beverage. After the level 71 of the beverage 70 has risen to the level of the second lower end 52 of the dispensing tube 5, the smaller container 4 communicates with the atmosphere only through the pipe formed by the wall of the dispensing tube 5, during the dispensing tube 5 is fed with a pre-determined amount of beverage from the smaller container 4. As shown in FIG. 3, the beverage seals the second lower end 52, so as to form a sealed space 12 between the level of the beverage 71 and the inner surface of the smaller container, which is not soaked by the beverage.

There exist following relationships between the pressure intensity P1 on the first upper end 31 of the connecting channel, the pressure intensity P2 on the level of the beverage 71 and the pressure intensity P3 on the second lower end 52 of the dispensing tube 5:

Because pressure intensity exerted on liquid in a sealed container can be transferred equally in all directions by the liquid, the pressure intensity P1 equals to the pressure intensity P2. As the pressure intensity P3 equals to the atmospheric pressure, the pressure intensity P3 is less than the pressure intensity P2, and the pressure intensity difference between the pressure intensity P3 and the pressure intensity P2 equals to the pressure intensity generated by height of the beverage in the larger container 2, namely from the upper liquid level of the beverage 60 to the first bottom wall 24.

Figure 4:
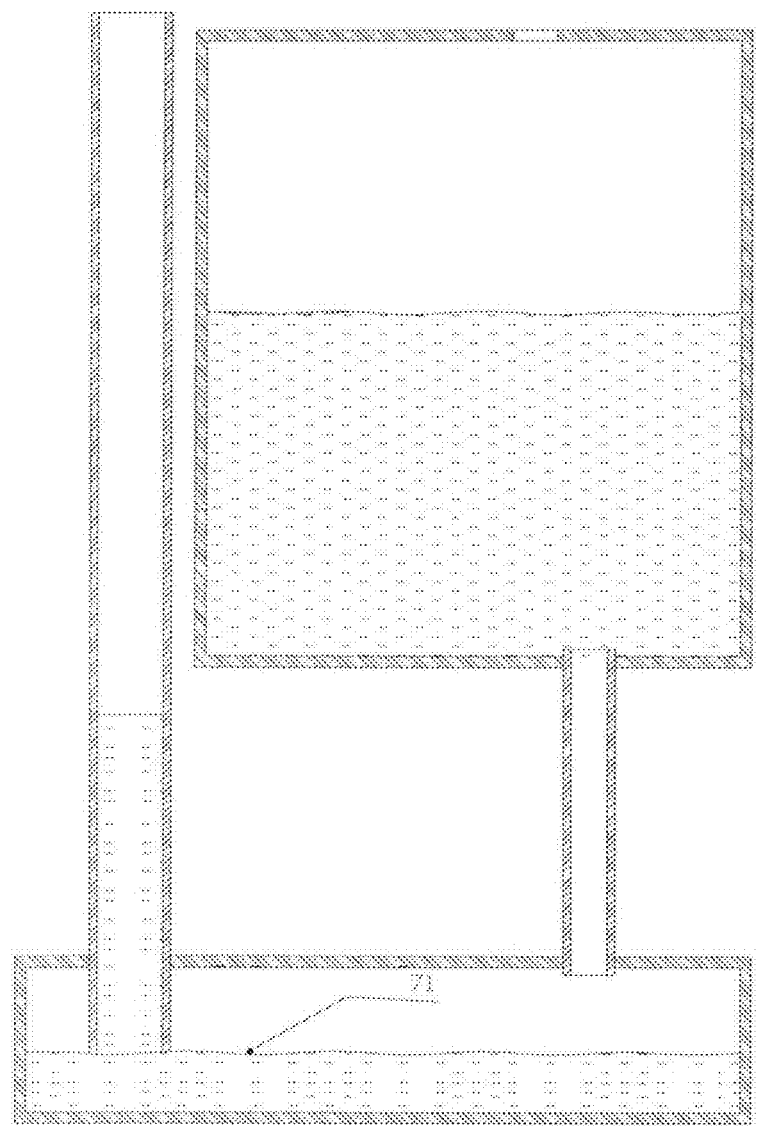
FIG. 4 is a sectional view illustrating the beverage dispenser as shown in FIG. 1, when the beverage level continuously rises.
Figure 5:
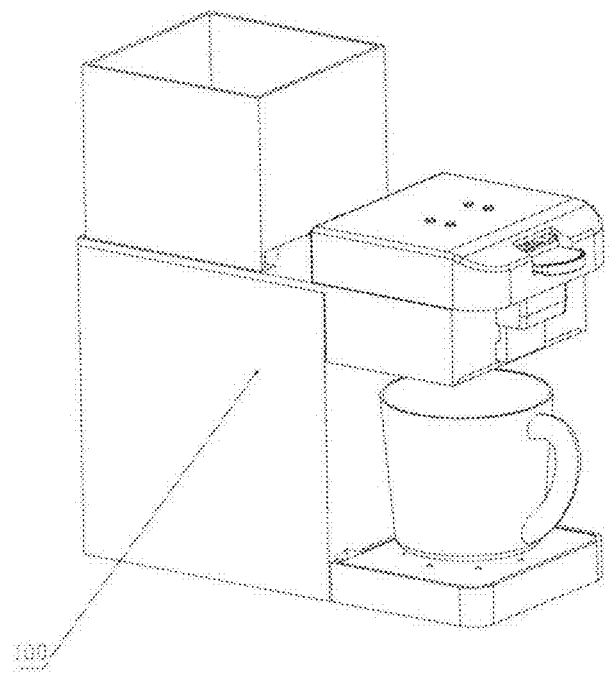
FIG. 5 is a schematic view of the whole coffee maker according to the second embodiment of the present invention.
Figure 6:
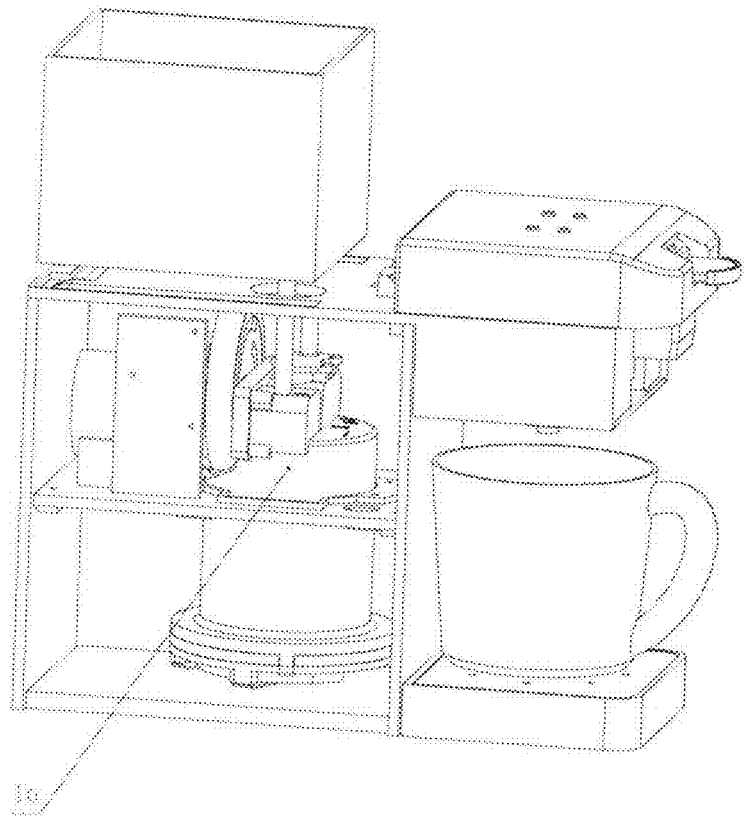
FIG. 6 is a schematic view illustrating the assembling position of the beverage dispenser in the coffee maker as shown in FIG. 5.

As shown in FIG. 4, the level 71 of the beverage 70 continues rising because of the pressure intensity difference, and the increased height equals to the height of the beverage in the larger container 2. When the pressure intensity P3 equals to the pressure intensity P1 and equals to the pressure intensity P2 respectively, the transfer of the beverage from the larger container 2 to the smaller container 4 is finished. Preferably, the dispensing tube 5 has a slim and long structure. Although the volume of the beverage in the tube will be affected by the height of the beverage in the larger container 2, the effect is generally fairly small for dispensing the beverage.

By adjusting the inserted depth of the second lower end 52 of the dispensing tube 5 in the smaller container 4, the level of the sealed beverage 71 can be changed, accordingly, dispensing of different pre-determined amounts of beverage is achieved. The different amounts can be read from the volume scale 55 on the dispensing tube.

Alternatively, a plurality of dispensing tubes are inserted into the smaller container 4 with different inserted depths. As long as at least one of these dispensing tubes opens to the atmosphere, the pre-determined amount of the liquid in the smaller container 4 can achieved as well.

The Second Embodiment

The second embodiment discloses a coffee maker, which comprises a housing, a beverage dispenser and a brewing unit, both installed inside the housing. The beverage dispenser communicates with the brewing unit.

As shown in FIGS. 5, 6, 7 and 8, the coffee maker is a single cup capsule coffee maker 100, which dispenses a pre-determined amount of coffee through the beverage dispenser 1*a*.

Figure 7:
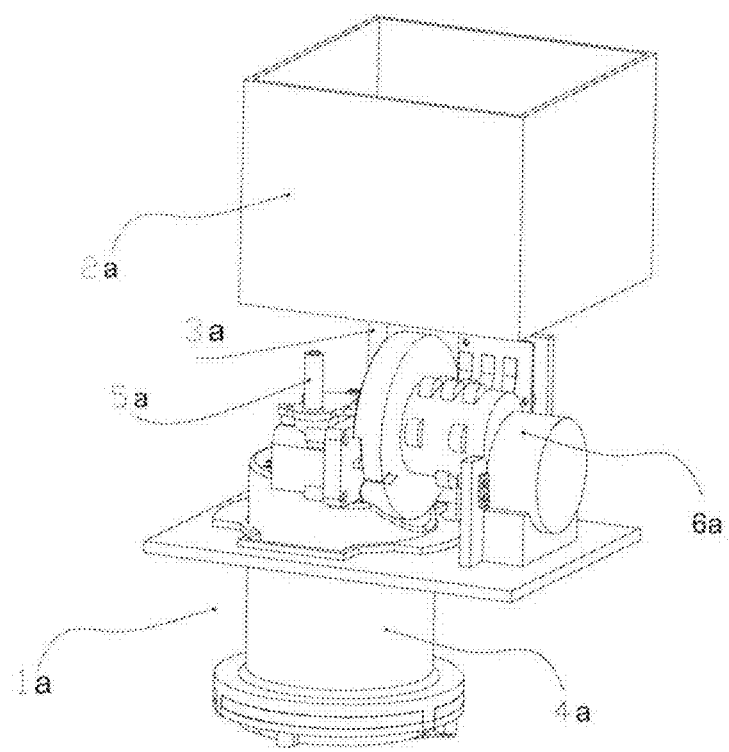
FIG. 7 is a stereogram of the beverage dispenser as shown in FIG. 6.
Figure 8:
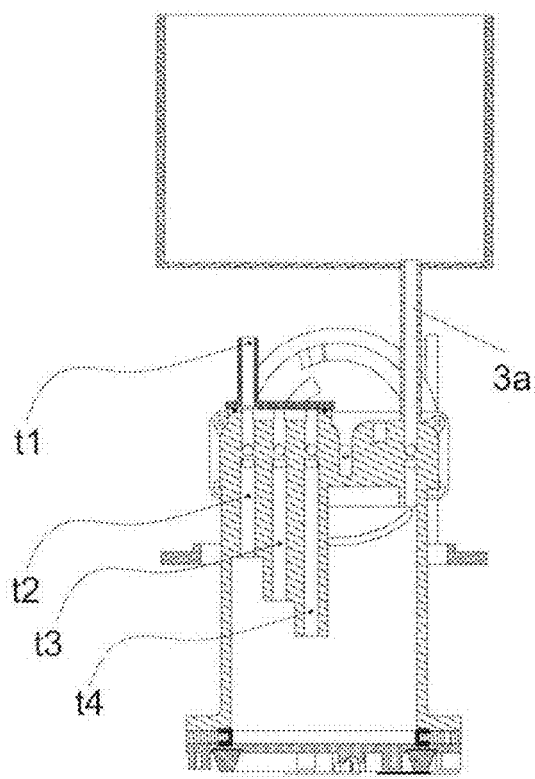
FIG. 8 is a sectional view of the beverage dispenser as shown in FIG. 6.

As shown in FIGS. 7 and 8, the larger container of the beverage dispenser 1*a* is a larger tank 2*a* for accommodating the beverage to be dispensed; the smaller container is a smaller tank 4*a* for accommodating the beverage dispensed. The larger tank 2*a* and the smaller tank 4*a* are connected through a connecting tube 3*a*, and the larger tank 2*a* is disposed above the smaller tank 4*a*. The rationing vessel is a valve body 5*a* provided with a plurality of channels. The valve body 5*a* has a common tube t1 and more than one branch tubes, the opening of the common tube t1 opens to the atmosphere, the branch tubes comprise a first branch tube t2, a second branch tube t3 and a third branch tube t4. The common tube t1 is located above the first branch tube t2, the second branch tube t3 and the third branch tube t4. The lower opening of the first branch tube t2, the lower opening of the second branch tube t3 and the lower opening of the third branch tube t4 are respectively positioned at different levels in the inner cavity of the smaller container.

The common tube t1 is respectively connected to the first branch tube t2, the second branch tube t3 and the third branch t4 through an open-close dispensing device. The open-close dispensing device is connected with an electric motor 6*a* and driven by the electric motor 6*a*. When a user gives signals to dispense a pre-determined amount of coffee through the first branch tube t2, the second branch tube t3 or the third branch tube t4, the electric motor 6*a* drives the open-close dispensing device to connect the corresponding branch tube, so as to form the dispensing tube described above, and the formed dispensing tube is used to dispense a pre-determined amount of coffee in the way as described above, which will be understood by those skilled in the art and will not be described here again.

There are several kinds of open-close dispensing devices, such as a solenoid valve, a mechanical valve, or a combination of solenoid valve and mechanical valve, and so on.

The embodiments of the present invention above are only preferred embodiments described specifically and in details, but they are not restricted. It will be understood by those skilled in the art that various changes and improvements based on the thoughts of the present disclosure may be made therein without departing from the scope of the disclosure. Accordingly, the scope of the disclosure is defined in the claims.

What is claimed is:

1. A beverage dispenser, comprising a larger container, a smaller container and a connecting channel connecting the larger container and the smaller container; wherein, an upper liquid level of an inner cavity of the larger container is higher than a highest liquid level of an inner cavity of the smaller container; the beverage dispenser further comprising one or more dispensing tubes, each of the dispensing tubes open at both ends and each having a second upper end, a second lower end and a third side wall;

wherein the larger container comprises a first top wall, a first bottom wall and a first side wall connecting the first top wall and the first bottom wall; the first top wall has a vent the first bottom wall is provided with an opening;

wherein the smaller container comprises a second bottom wall, a second top wall and a second side wall connecting the second top wall and the second bottom wall; the second top wall of the smaller container has a first opening and a second opening;

wherein the connecting channel opens at both ends and has a tube wall, a first upper end and a first lower end; the first upper end of the connecting channel is tightly connected and fit with an opening in the first bottom wall of the larger container; the first lower end is tightly connected and fit with a first opening of the smaller container;

wherein a level of the second upper end of the dispensing tube is higher than the highest liquid level of the inner cavity of the larger container; an upper opening is disposed in the second upper end and opens to atmosphere;

wherein the second lower end of the dispensing tube passes through a second opening of the smaller container and is inserted inside the smaller container; and wherein the third side wall of the dispensing tube is detachably connected to the second opening of the smaller container.

2. The beverage dispenser according to claim 1, wherein, outer surface of the third side wall of the dispensing tube is marked with volume scale.

3. The beverage dispenser according to claim 1, wherein, a level of the first lower end of the connecting channel, which is disposed in the smaller container, is higher than a level of the second lower end of the dispensing tube, which is disposed in the smaller container.

4. The beverage dispenser according to claim 3, wherein, a level of the first bottom wall of the larger container is higher than a level of the second top wall of the smaller container.

5. A coffee maker, comprising a housing, the beverage dispenser according to claim 1, and a brewing unit, the beverage dispenser and the brewing unit are installed inside the housing; and the beverage dispenser communicates with the brewing unit.

6. The coffee maker according to claim 5, wherein, the larger container of the beverage dispenser is a larger tank for accommodating the beverage to be dispensed; the smaller container is a smaller tank for accommodating the beverage dispensed; the larger tank and the smaller tank are connected through a connecting tube; the larger tank is disposed above the smaller tank; the rationing vessel is a valve body provided with a plurality of channels; the valve body has a common tube and more than one branch tubes, the opening of the common tube opens to atmosphere; the branch tubes comprise a first branch tube, a second branch tube and a third branch tube; the common tube is located above the first branch tube, the second branch tube and the third branch tube; a lower opening of the first branch tube, a lower opening of the second branch tube and a lower opening of the third branch tube are respectively positioned at different levels in the inner cavity of the smaller container.

7. The coffee maker according to claim 6, wherein, the common tube is respectively connected to the first branch tube, the second branch tube and the third branch tube through an open-close dispensing device; the open-close dispensing device is connected with an electric motor and driven by the electric motor; and the open-close dispensing device is a solenoid valve or a mechanical valve.

* * * * *